US 9,843,787 B2

(12) United States Patent
Georgiev et al.

(10) Patent No.: US 9,843,787 B2
(45) Date of Patent: Dec. 12, 2017

(54) GENERATION AND USE OF A 3D RADON IMAGE

(71) Applicant: QUALCOMM Incorporated, San Diego, CA (US)

(72) Inventors: Todor Georgiev Georgiev, Sunnyvale, CA (US); Salil Tambe, Houston, TX (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 14/261,162

(22) Filed: Apr. 24, 2014

(65) Prior Publication Data

US 2015/0312549 A1    Oct. 29, 2015

(51) Int. Cl.
*G06T 7/00* (2017.01)
*H04N 5/238* (2006.01)
*H04N 13/02* (2006.01)
*H04N 13/00* (2006.01)
*G06T 5/50* (2006.01)

(52) U.S. Cl.
CPC ......... *H04N 13/0203* (2013.01); *G06T 5/50* (2013.01); *H04N 13/0022* (2013.01); *G06T 2200/21* (2013.01); *G06T 2207/10052* (2013.01); *G06T 2207/20061* (2013.01); *H04N 13/0011* (2013.01); *H04N 2013/0081* (2013.01)

(58) Field of Classification Search
CPC combination set(s) only.
See application file for complete search history.

(56) References Cited

U.S. PATENT DOCUMENTS

| | | | |
|---|---|---|---|
| 8,400,555 B1 | 3/2013 | Georgiev et al. | |
| 8,471,920 B2 | 6/2013 | Georgiev et al. | |
| 8,619,177 B2 | 12/2013 | Perwass et al. | |
| 8,619,179 B2 | 12/2013 | Imai | |
| 9,013,477 B2* | 4/2015 | Schmeitz | H04N 5/2254 345/419 |
| 2007/0097492 A1* | 5/2007 | Takasu | B23B 1/00 359/362 |

(Continued)

OTHER PUBLICATIONS

"Compression." Merriam-Webster.com. Merriam-Webster, n.d. Web. Jun. 11, 2016.*

(Continued)

*Primary Examiner* — Dave Czekaj
*Assistant Examiner* — Alison Slater
(74) *Attorney, Agent, or Firm* — Knobbe, Martens, Olson & Bear, LLP

(57) ABSTRACT

Certain aspects relate to systems and techniques for efficiently recording captured plenoptic image data and for rendering images from the captured plenoptic data. The plenoptic image data can be captured by a plenoptic or other light field camera. In some implementations, four dimensional radiance data can be transformed into three dimensional data by performing a Radon transform to define the image by planes instead of rays. A resulting Radon image can represent the summed values of energy over each plane. The original three-dimensional luminous density of the scene can be recovered, for example, by performing an inverse Radon transform. Images from different views and/or having different focus can be rendered from the luminous density.

26 Claims, 8 Drawing Sheets

(56) References Cited

U.S. PATENT DOCUMENTS

2013/0127901 A1 5/2013 Georgiev et al.
2015/0146032 A1* 5/2015 Rime .................. H04N 7/01
                                                 348/222.1

OTHER PUBLICATIONS

Briggs W. L., et al., "The DFT, An Owner's Manual for the Discrete Fourier Transform", SIAM, 1995, pp. 286-297.

Buzug T. M., "Computed tomography", In Springer Handbood of Medical Technology, 2012, Springer, pp. 311-342.

Deans S. R., "The Radon Transform and Some of Its Applications", Dower, 1983, p. 111.

Georgiev T, et al., "Spatio-Angular Resolution Tradeoffs in Integral Photography", Rendering Techniques, 2006, pp. 263-272.

Gershun A, "The Light Field", Translated by P. Moon and G. Timoshenko in Journal of Mathematics and Physics, 1936/1939, vol. 18, pp. 51-151.

Helgason S, "Radon Transform", Birkhauser, 1999, pp. 1-82 (Chapters 1 and 2).

Levin A, et al., "Linear View Synthesis Using a Dimensionality Gap Light Field Prior", In Computer Vision and Pattern Recognition (CVPR), 2010 IEEE Conference on, IEEE, 2010, pp. 1831-1838.

Lumsdaine A, et al., "The Focused Plenoptic Camera", In Computational Photography (ICCP), 2009 IEEE International Conference on, IEEE, 2009, pp. 1-8.

Macovski A., "Medical Imaging Systems", Prentice-Hall, Inc. Upper Saddle River, NJ 07458, 1983, Table of Contents.

Ng R., "Digital Light Field Photography", PhD thesis, Stanford University, 2006, pp. 1-187.

Radon J, "On the Determination of Functions from their Integral Values Along Certain Manifolds", IEEE Transactions on Medical Imaging, vol. 5 (4), pp. 170-176, Doi: 10.1109/TMI.1986.4307775, PMID 18244009.

Georgiev T., et al., "The Radon Image as Plenoptic Function", 2014 IEEE International Conference on Image Processing (ICIP), Oct. 27, 2014, XP055205391, pp. 1922-1926, DOI:10.1109/ICIP.2014.7025385 ISBN:978-1-47-995751-4.

International Search Report and Written Opinion—PCT/US2015/022804—ISA/EPO—dated Aug. 10, 2015.

Lam E.Y, "Computational Photography: Advances and Challenges", SPIE, PO Box 10 Bellingham WA 98227-0010, USA, vol. 8122, Aug. 21, 2011, XP040563501, pp. 812200-1-812200-7.

Levoy M., et al., "Light Field Rendering", Computer Graphics Proceedings (SIGGRAPH 1996). New Orleans, Louisiana; Aug. 4-9, 1996, pp. 31-42, Aug. 8, 1996 (Aug. 4, 1996); XP000682719.

Lumsdaine A. et al., "The focused plenoptic camera", IEEE International Conference on Computational Photography (ICCP 2009), Apr. 16, 2009 (Apr. 16, 2009), pp. 1-8; XP031740267; ISBN: 978-1-4244-4534-9.

Marichal-Hernandez J.G., et al., "Fast approximate 4-D/3-D discrete radon transform for Lightfield refocusing", Journal of Electronic Imaging, vol. 21, No. 2, Jul. 3, 2012, XP055205378, pp. 023026-1-023026-12, ISSN:1017-9909, DOI:10.1117/1.JEI.21.2.023026.

Matus F., et al., "Image representation via a finite Radon transform", IEEE Transactions on Pattern Analysis and Machine Intelligence, vol. 15, No. 10, Oct. 1993, XP055205390, pp. 996-1006, DOI: 10.1109/34.254058, Retrieved from the Internet: URL:http://ieeexplore.ieee.org/xpls/abs_all.jsp?arnumber=254058.

Yamashita K., et al., "Compressive acquisition of ray-space using radon transform", Stereoscopic Developments II, vol. 7237, Jan. 18, 2009, XP040493754, pp. 723715-1-723715-10.

* cited by examiner

PLENOPTIC IMAGING SYSTEMS

RADON TRANSFORM OF LIGHT FIELD

__(1)__

GENERATION AND USE OF A 3D RADON IMAGE

TECHNICAL FIELD

The systems and methods disclosed herein are directed to image data, and, more particularly, to capture of and rendering from plenoptic data.

BACKGROUND

The field of photography continues to develop, offering more options to a photographer. With analog photography, developed film revealed the final result of the exposure, color balance, focus, and other image capture factors as they had occurred at the time of image capture. Until recently, digital photography has been about digitizing what used to be an analog process. Digital photography affords more options to photographers than analog photography after an image is captured, as processing applications can be used to enhance and clean up the image respecting certain qualities like exposure, color balance, saturation, and others. However, if the focus of the captured digital image is off, or if the photographer wishes to shift to a different viewpoint, existing processing applications cannot correct for these factors.

Plenoptic photography comes closer to rendering the full variety of view angles and multiple focal points offered by the direct observation of objects by capturing the light field, also referred to as radiance, of a target image scene. To capture a plenoptic image, a microlens array can be mounted in front of an image sensor, effectively capturing many images of a target scene, with each image capturing a portion of the target scene from a slightly different viewpoint. As such, multiple light rays are captured from varying viewpoints for each pixel of a synthesized final image of the scene. This provides raw sensor data containing four-dimensional radiance data about each pixel point in a potential final image of the target scene: two dimensions of the spatial position of a light ray and two dimensions of the orientation of a light ray at the pixel. With software, this data can be synthesized into a final 2D or 3D image from any of the vantage points or focus points represented by the radiance data, extending the capabilities of digital photography and affording greater flexibility for photographers to alter vantage point or focus after image capture.

Plenoptic camera technology offers several imaging capabilities that may be desirable in mobile devices, including but not limited to full 3D imaging, refocusabilty, and High Dynamic Range (HDR) imaging. However, processing the plenoptic sensor data is computationally expensive, typically requiring parallel processing on central processing units (CPUs) or intensive processing on a graphics processing unit (GPU). Accordingly, plenoptic photography requires prohibitively large amounts of data storage and processing for implementation in mobile photography, given the relatively limited GPU memory of conventional mobile devices.

SUMMARY

Aspects of the invention relate to techniques for efficiently recording appropriately transformed captured plenoptic image data (for example in a plenoptic camera) and a technique for rendering images from such transformed captured plenoptic data, referred to herein as "Radon photography." For example, the structure of captured plenoptic data can be changed by using a Radon transform so that the dimensionality is reduced from four dimensions to three dimensions, thereby generating image data (referred to herein as a "Radon image") having a smaller size than traditional plenoptic images. A final image can be rendered from the Radon image using inverse Radon transform or other computed tomography techniques to recover the radiance or luminous density of the plenoptic data. Compared with existing methods, this can reduce the amount of data by about an order of magnitude, making it possible to perform rendering using much less GPU memory than existing plenoptic rendering techniques, for example on a mobile device.

Accordingly, one aspect relates to a system in an electronic device for rendering a final image, the system comprising a plenoptic camera including a microlens array and an image sensor, the plenoptic camera configured to capture plenoptic image data of an image scene; and one or more processors in data communication with the plenoptic camera and configured to at least receive the captured plenoptic image data, the captured plenoptic image data including a plurality of microimages each formed by one of a plurality of microlenses in the microlens array focusing light from the image scene onto the image sensor, determine a plurality of lines of integration located within a plane bisecting the microlens array, each of the plurality of lines of integration corresponding to a plane extending through three dimensional space of the image scene, and generate a Radon image based at least partly on a plurality of pixels of the plenoptic image data corresponding to the plurality of lines of integration.

Another aspect relates to a system in an electronic device for rendering a final image, the system comprising a first module configured to at least access data representing a Radon image, the Radon image representing, for each sampled plane of a plurality of sampled planes of an image scene, a sum of light energy in the sampled plane; a second module configured to at least determine a luminous density of the image scene based at least partly on integrating the sum of light energy from each sampled plane of the plurality of sampled planes of the Radon image; and a third module configured to at least project the luminous density onto an image plane to produce the final image.

Another aspect relates to a method for compressing plenoptic image data, the method comprising receiving at least a portion of data representing a plenoptic image of a three-dimensional image space from a plenoptic camera having a microlens array and an image sensor; identifying a plane of integration intersecting a microlens plane, the microlens plane bisecting the microlens array; determining an image line intersecting the plane of integration and an image plane located a first distance from the microlens plane; determining a microlens line intersecting the plane of integration and the microlens plane; mapping the image line to a microimage based at least partly on intersection of microlens line and the microlens, the microimage formed on the image sensor by a microlens of the microlens array; and summing pixel values for each of a plurality of pixels in the microimage, the plurality of pixels located along the image line mapped to the microimage.

Another aspect relates to a non-transitory, computer-readable medium storing instructions that, when executed, cause one or more computing devices to perform operations comprising receiving Radon image data of an image scene, the Radon image data representing a luminous density of the image scene as summed values of light energy in each of a plurality of planes of the image scene; computing an intermediate function of the Radon image using a back-projection of the Radon image; recovering the luminous density of the image scene based at least partly on the intermediate function of the Radon image; and projecting the luminous density onto an image plane to produce a dynamically refocusable rendered image of the image scene.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Figures 1A, 1B:
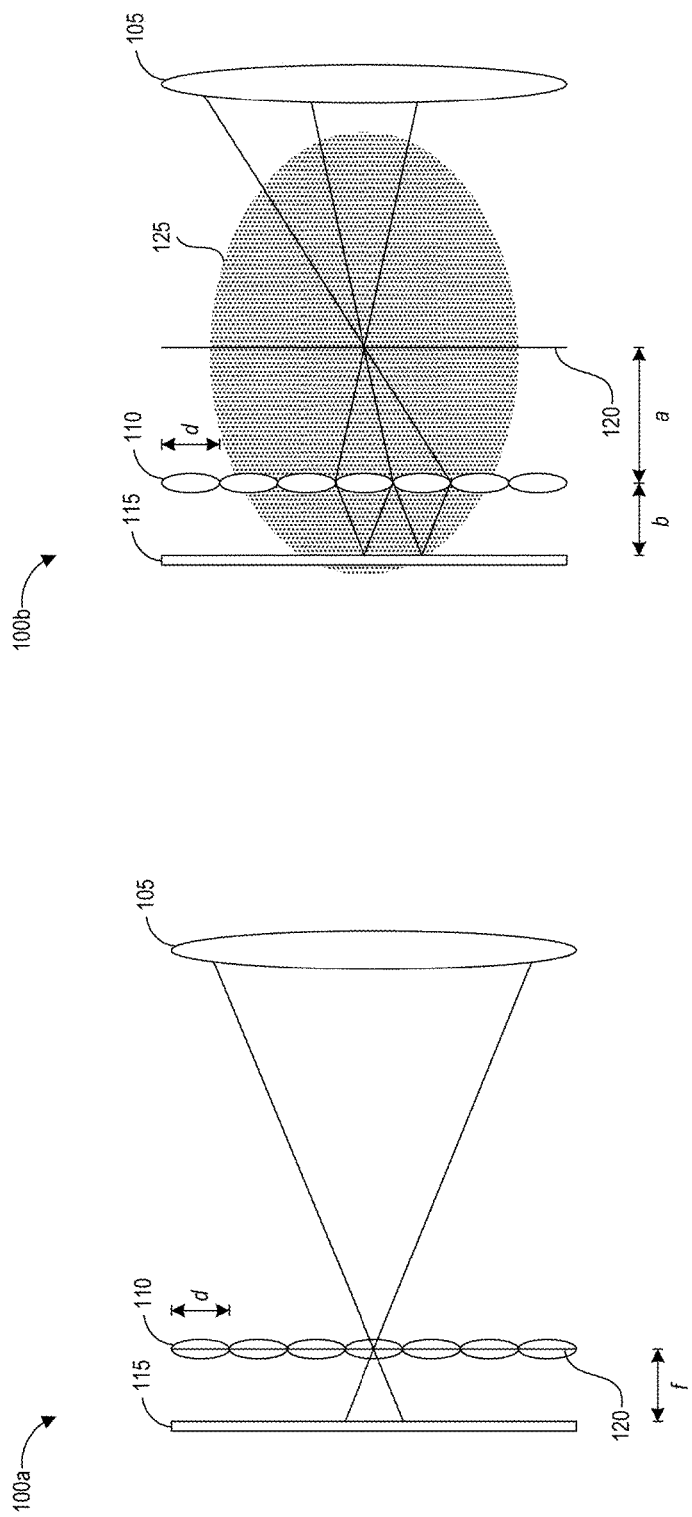
FIG. 1A illustrates an embodiment of conventional plenoptic camera.
FIG. 1B illustrates an example focused plenoptic camera (Keplerian telescopic case), according to some embodiments.

Embodiments of the disclosure relate to systems and techniques for capturing plenoptic image data, processing the plenoptic image data to increase efficiency, and rendering from the processed plenoptic image data. The Radon photography techniques described herein can change the structure of captured plenoptic data to define the radiance of a target image scene in terms of energy contained within two-dimensional planes rather than within one-dimensional rays, which can effectively reduce the amount of image data by about an order of magnitude. For example, this can be accomplished in some implementations by applying a Radon transform to the plenoptic image data, generating a Radon image. A dynamically refocusable image can be rendered from the Radon image by applying the inverse Radon transform to recover the radiance of the image scene from the Radon image. In one example, a Radon image can be approximately 1 megabyte (MB) of data while a typical plenoptic image can be approximately 50 MB of data. This can enable plenoptic imaging on mobile devices with limited GPU capacity, for example smart phones and tablet computers.

The Radon photography technique described herein can record captured plenoptic data using a transform related to the Radon transform to reduce the quantity of captured plenoptic data. The information captured by plenoptic cameras may be referred to as the light field, the plenoptic function, or radiance. In computational photography, a light field (which may also be referred to as radiance, luminous density, or the plenoptic function) is a four-dimensional record of all one-dimensional light rays in the three-dimensional space of the target image scene. Radiance describes both spatial and angular information, and is defined as density of energy per unit of area per unit of stereo angle (in radians). A plenoptic camera captures radiance in plenoptic images (also referred to as flat images, or flats). When processed, plenoptic images may be digitally refocused, noise may be reduced, viewpoints may be changed, and other plenoptic effects may be achieved. Note that, in the literature, plenoptic cameras may also be referred to as light field cameras, and plenoptic images may also be referred to as light field images.

Using the Radon transform, the four-dimensional radiance data of the image scene can be represented as an alternative plenoptic function depending on only three variables, which is the Radon image of the density of virtual light sources. Radon photography techniques can capture or represent the energy density of a three-dimensional body in the image scene by cutting it with multiple thin virtual planes and integrating over each plane. The energy in each plane can be measured to construct the Radon image. Accordingly, the resulting Radon image can represent the summed values of energy over each plane between the image plane and the sensor plane rather than traditional plenoptic image data which represents the values of energy of each light ray between the image plane and the sensor plane. The Radon image, being a three-dimensional representation of the four-dimensional radiance of the image scene, is therefore much more economical in terms of memory and thus faster to render as compared to previous plenoptic imaging methods.

The original three-dimensional luminous density of the scene can be recovered, for example, by performing an inverse Radon transform, and images from different views and/or having different depths of focus can be rendered from the luminous density. In one implementation, the Radon photography technique can effectively integrate rays that fall within a plane and can evaluate the Radon transform over all planes passing through a point to perform back projection. Back projection can be the first step done in order to derive the inverse Radon transform at that point. Specific lines of integration can be chosen to sample each microlens in the array with a sufficient step size between adjacent lines of integration to avoid sampling the same set of pixels, which would lead to redundant information. Through back-projection, application of the Laplacian of Gaussian operator, and denoising, the Radon photography technique can determine the luminous density in the scene from the Radon image. Projecting the luminous density onto an image plane can produce a final image, wherein the final image can be adjusted to have different views or different depths of focus of the captured image scene.

Overview of Example Plenoptic Cameras

FIGS. 1A-1D illustrate various embodiments of plenoptic cameras that can be used to capture Radon image data according to the Radon photography technique. The plenoptic imaging systems of FIGS. 1A-1D can be implemented in a variety of imaging applications, for example still photography, videography, stereoscopic photography, stereoscopic videography, multispectral photography, and multispectral videography. Devices such as handheld cameras, tablet computers, mobile phones, gaming consoles, laptops, personal computers, augmented reality devices such as headsup display systems, security cameras, and the like can incorporate the plenoptic imaging systems of FIGS. 1A-1D.

FIG. 1A illustrates a conventional plenoptic camera 100a. The components shown in this Figure are not necessarily to scale relative to each other. A conventional plenoptic camera can include a main lens 105 and a microlens array 110 placed at distance $f$ in front of a photo sensor 115. In some implementations, a charge-coupled device (CCD) can be used as the photo sensor 115. In other implementations, a CMOS imaging sensor can be used as the photo sensor 115. The microlenses 110 can have aperture d and focal length $f$, and are assumed to be equally spaced at interval d. The main lens 105 can be focused at the plane formed by the center of the microlens array 110 ("microlens plane"), and the microlenses 110 can be focused at optical infinity (equivalently, at the main lens 105).

Considering that the focal length of the main camera lens 105 is much greater than the focal length of the microlenses 110, each "micro camera" can be focused at the main camera lens aperture, and not on the object being photographed. Each microlens image can thus be completely defocused relative to that object, and represents only the angular distribution of the radiance. As such, these microimages can look blurry and do not represent a human-recognizable image. Since each microlens image can sample a given location depending on its position and spans the same angular range as the other microlens images, rendering an output image from a conventional plenoptic camera radiance image can be accomplished by integrating all of the pixels under each microlens. Integrating a fixed portion of the pixels under each microlens can generate an image of one certain view. In some embodiments, each microlens contributes to a single pixel in the final generated image.

Figure 1C:
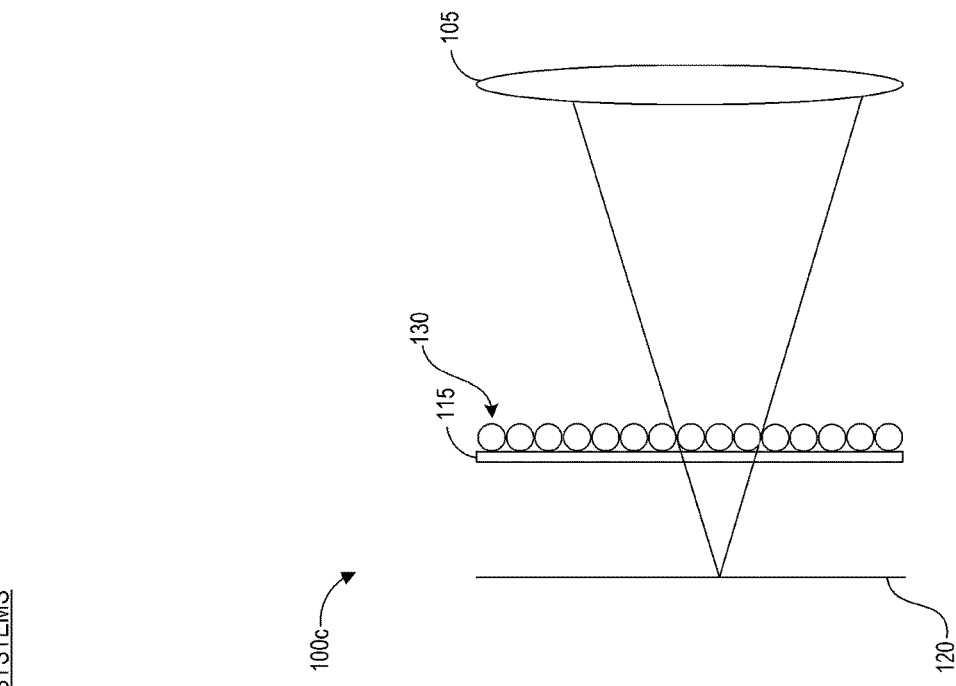
FIG. 1C illustrates an example focused plenoptic camera (Galilean telescopic case), according to some embodiments.

FIGS. 1B and 1C illustrate example focused plenoptic cameras 100b and 100c, respectively, according to some embodiments. The components shown in FIGS. 1B and 1C are not necessarily to scale relative to each other, nor are the distances between the components necessarily to scale, nor are the sizes of the components necessarily to scale. The focused plenoptic cameras 100b, 100c may include at least a main lens 105, a microlens array 110, and a photo sensor 115. In contrast to the conventional plenoptic camera system 100a of FIG. 1A, the microlens array 110 of a focused plenoptic camera 100b, 100c can be focused on an image plane 120 of the main camera lens instead of at infinity. With a focused plenoptic camera 100b, 100c, each microlens can reimage the main lens image onto the photo sensor 115. The microlenses 110 can form an array of true images of the main lens image as a relay system, thereby each forming a microimage on the photo sensor 115.

An array of micro cameras (formed by the projection of the microlenses 110 onto the photo sensor 115) observe the "object" in front of them. This "object" is the aerial 3D image of the scene, formed behind the main camera lens 105, represented as a shaded ovoid in FIGS. 1B and 1C. Accordingly, the ovoid shaded area 125 in FIGS. 1B and 1C represent the three-dimensional (3D) image formed inside the camera by the main camera lens. As illustrated, this 3D image 125 may extend behind the microlenses 110.

FIG. 1B illustrates an example of a Keplerian telescopic system 100b wherein the image plane 120 being imaged is in front of the microlenses 110. If the main lens 105 forms an image behind the microlenses 110, it is still possible to focus the microlenses 110 onto that virtual image so that they form a real image on the photo sensor 115, such as in the example Galilean telescopic camera 100c of FIG. 1C. In both the Keplerian telescopic camera 100b and the Galilean telescopic camera 100c, the microlens imaging can be described by the lens equation:

$$\frac{1}{a} + \frac{1}{b} = \frac{1}{f} \quad (1)$$

with, respectively, positive a (Keplerian telescopic system 100b) or negative a (Galilean telescopic system 100c). When remapped onto the photo sensor, the image of the main lens can be reduced in size. This reduction may be denoted as:

$$m = \frac{a}{b} \quad (2)$$

As a result of this scaling, the spatial resolution of the radiance captured by the plenoptic camera is a function of the resolution of the microlens images and the amount of overlap in rendering, and not of the number of microlenses. This decoupling of resolution and number of microlenses distinguishes the focused plenoptic camera 100b, 100c from the conventional plenoptic camera 100a.

Another difference between the conventional plenoptic camera 100a and the focused plenoptic camera 100b, 100c is in the nature of the information that is captured by each microlens. In the conventional plenoptic camera 100a, each microlens images one position in the scene, capturing all of the angular information there. In the focused plenoptic camera 100b, 100c, different microlenses capture the same position; angular information is spread across microlenses. Accordingly, to render flats captured with the focused plenoptic camera 100b, 100c, the rendering algorithm can integrate across microlens images, rather than within a single microlens image. That is, assuming that the task is "imaging the image" that is in focus, the rendering algorithm integrates the points in the microlenses that correspond to the same position in the image by overlapping them at a fixed pitch.

Figure 1D:
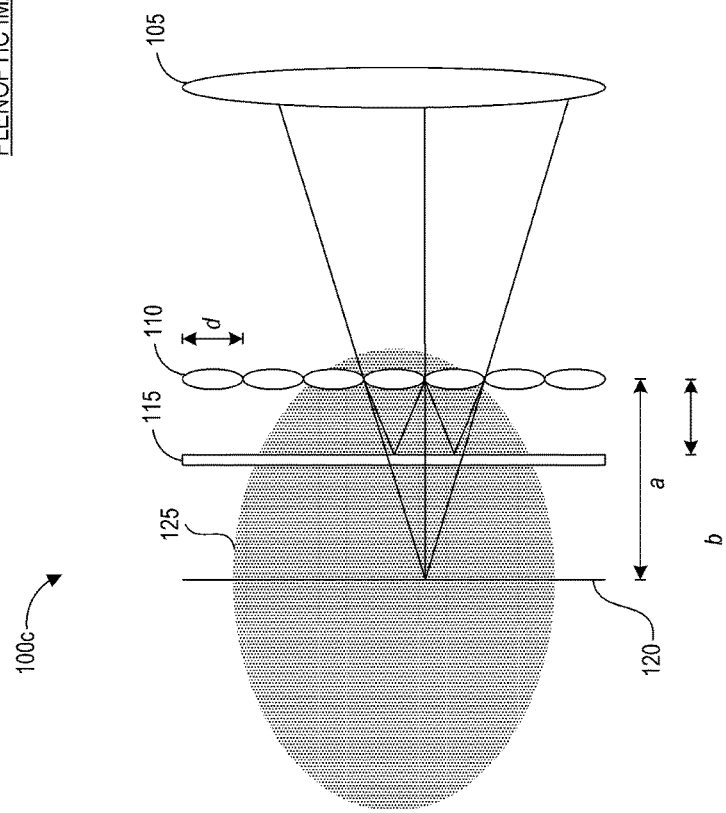
FIG. 1D illustrates an example thin plenoptic camera based on microspheres, according to some embodiments.

FIG. 1D illustrates an example thin plenoptic camera system 100d based on microspheres, according to some embodiments. This example thin plenoptic camera 100d may be similar to the focused plenoptic camera 100c illustrated in FIG. 1C; however, the microlens array is replaced by microspheres 130. The microspheres 130 may be attached or fixed to the surface of the photo sensor 115 by any of several techniques; for example a thin layer (e.g., a few nanometers thick) of a transparent adhesive material may deposited on the pixel surface of the photo sensor 115, a layer of molten glass or a similar substance may be deposited on the pixel surface of the photo sensor 115, or the microspheres 130 may be embedded in a substance that is very flat on top, while covering the microspheres 130. With appropriately selected and arranged components, a thin plenoptic camera as illustrated in FIG. 1D may be approximately 5 mm (millimeters) thin, or even thinner, and thus suitable for use in thin mobile devices.

FIGS. 1A-1D are intended to illustrate example plenoptic camera systems 110a-110d that can carry out the Radon photography techniques described herein. However, it will be appreciated that any plenoptic or light field camera capable of capturing the radiance of an image scene can implement Radon photography techniques in order to reduce the amount of captured image data. In some embodiments, a camera can directly capture a 3D Radon image instead of capturing 4D radiance data and generating the 3D Radon image from the 4D radiance data.

Overview of Example System

Figure 2:
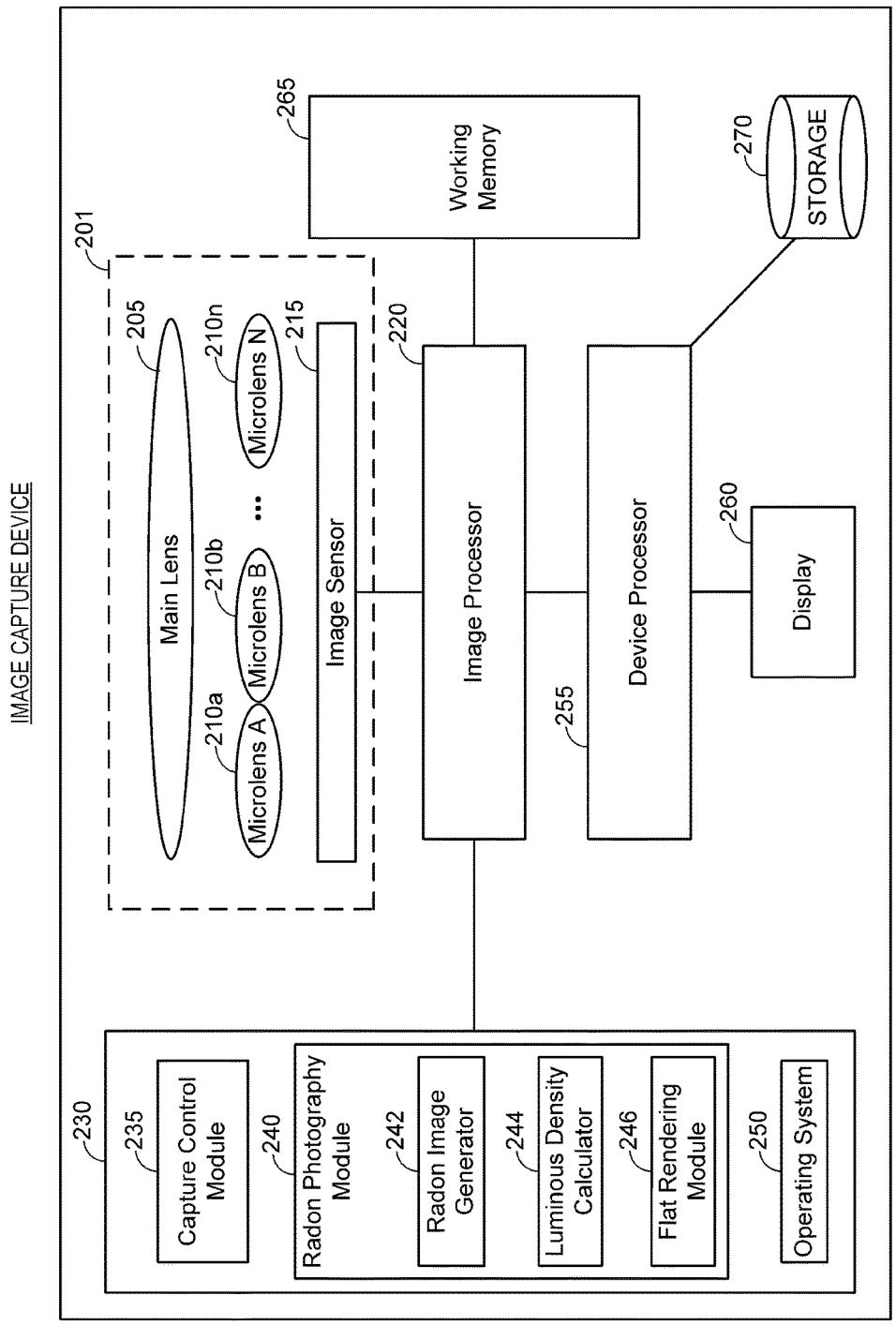
FIG. 2 illustrates a high-level schematic block diagram of an embodiment of an image capture device having Radon photography capabilities.

FIG. 2 illustrates a high-level schematic block diagram of an embodiment of an image capture device 200 having Radon photography capabilities, the device 200 having a set of components including an image processor 220 linked to a camera assembly 201. The image processor 220 is also in communication with a working memory 265, memory 230, and device processor 255, which in turn is in communication with storage 270 and an optional electronic display 260.

Device 200 may be a cell phone, digital camera, tablet computer, personal digital assistant, or the like. There are many portable computing devices in which rendering from a reduced quantity of plenoptic image data such as is described herein would provide advantages. Device 200 may also be a stationary computing device or any device in which the Radon photography technique would be advantageous. A plurality of applications may be available to the user on device 200. These applications may include traditional photographic and video applications, high dynamic range imaging, panoramic photo and video, multispectral photo and video, stereoscopic imaging such as 3D images or 3D video, and plenoptic photo and video.

The image capture device 200 includes plenoptic camera assembly 201 for capturing external images. The camera 201 can be any of the plenoptic camera configurations 100a-100d described above with respect to FIGS. 1A-1D, in some embodiments. Although depicted with a main lens 205, microlens A 210a through microlens N 210n, and a single image sensor 215, embodiments of camera 201 other than the example illustration can have any combination of some or all of the main lens 205, microlens array 210a-210n, and sensor 215 capable of capturing the radiance data of a target image scene. In general, N microlenses can be used, where N≥2. Some embodiments of the plenoptic camera assembly 201 can have additional components, for example additional lens assemblies and corresponding additional image sensors for capture of stereoscopic or multispectral plenoptic image data. In some embodiments, device 200 can include additional camera assemblies, for example a traditional (non-plenoptic) camera assembly in addition to the plenoptic camera assembly 201. The plenoptic camera assembly 201 can be coupled to the image processor 220 to transmit captured image to the image processor 220.

The image processor 220 may be configured to perform various processing operations on received image data comprising N microimages corresponding to the N microlenses in order to execute the Radon photography technique. Processor 220 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Processor 220 may, in some embodiments, comprise a plurality of processors. Processor 220 may be one or more dedicated image signal processors (ISPs) or a software implementation of a processor.

As shown, the image processor 220 is connected to a memory 230 and a working memory 265. In the illustrated embodiment, the memory 230 stores capture control module 235, Radon photography module 240, and operating system 250. The Radon photography module 240 includes sub-modules: Radon image generator 242, luminous density calculator 244, and flat rendering module 246. The modules of the memory 230 include instructions that configure the image processor 220 of device processor 255 to perform various image processing and device management tasks. Working memory 265 may be used by image processor 220 to store a working set of processor instructions contained in the modules of memory 230. Alternatively, working memory 255 may also be used by image processor 220 to store dynamic data created during the operation of device 200.

As mentioned above, the image processor 220 is configured by several modules stored in the memories. The capture control module 235 may include instructions that configure the image processor 220 to adjust the focus position of plenoptic camera assembly 201. Capture control module 235 may further include instructions that control the overall image capture functions of the device 200. For example, capture control module 235 may include instructions that call subroutines to configure the image processor 220 to capture raw plenoptic image data of a target image scene using the plenoptic camera assembly 201. In one embodiment, capture control module 235 may then call the Radon photography module 240 to reduce the size of the captured plenoptic image data and output the reduced size image data to the imaging processor 220. In another embodiment capture control module 235 may then call the Radon photography module 240 to perform a rendering operation on the raw plenoptic data in order to output a flat, refocusable image to imaging processor 220. Capture control module 235 may also call the Radon photography module 240 to perform a rendering operation on raw plenoptic image data in order to output a preview image of a scene to be captured, and to update the preview image at certain time intervals, when the scene in the raw image data changes, or when a user changes the focus of the preview image.

Radon photography module 240 can call sub-modules Radon image generator 242, luminous density calculator 244, and flat rendering module 246 to perform different portions of the plenoptic data processing and image rendering operations. The Radon image generator 242 can include instructions that configure the image processor 220 to generate a Radon image, the Radon image being a relatively smaller quantity of data compared to the raw plenoptic image data. For example, Radon image generator 242 can include instructions that configure the image processor 220 to apply a Radon transform to plenoptic image data. Some embodiments of the Radon image generator 242 can operate on stored plenoptic image data, while other embodiments of the Radon image generator 242 can change the structure of plenoptic image data as it is captured prior to storage. For example, the pixels or microimages of a photo sensor can be scanned in rows or lines corresponding to intersection lines with a plane of integration, and the values of the light rays incident on those pixels or microimages can be integrated, as will be discussed in more detail below. In some embodiments, the Radon photography module 240 can transmit the Radon image to the image processor 220 for storage in the storage module 270. In some embodiments, the Radon photography module 240 can transmit the Radon image to the luminous density calculator 244.

The luminous density calculator 244 can include instructions that configure the processor 220 to perform processing operations on the Radon image to generate plenoptic image data from the Radon image. For example, the luminous density calculator 244 can include instructions that configure the processor 220 to apply an inverse Radon transform to the Radon image to recover the original luminous density captured by the plenoptic camera assembly 201, or to recover an approximation of the original luminous density.

The flat rendering module 246 can include instructions that configure the image processor 220 to perform a rendering operation on the output of the luminous density calculator 244. For example, the flat rendering module 246 can include instructions that configure the image processor 220 to output an image (sometimes referred to as a "flat" in plenoptic photography) by projecting the luminous density onto an image plane, which can produce a flat at different viewpoints or different depths of focus. The processor 220 can store the image or output the image for display to a user, wherein the user can dynamically refocus the image through a range of focus depths captured by the plenoptic image data, and can dynamically adjust a viewpoint of the image through a range of viewpoints captured by the plenoptic image data. As the user inputs commands to adjust the focus and/or viewpoint of the image, the flat rendering module 246 can include instructions that cause the image processor 220 to respond to the user commands and render an updated image. In some embodiments, the flat rendering module 246 can include instructions that configure the image processor 220 to output a three-dimensional or stereoscopic image and to update the image based on user input.

Operating system module 250 configures the image processor 220 to manage the working memory 265 and the processing resources of device 200. For example, operating system module 250 may include device drivers to manage hardware resources such as the camera assembly 201. Therefore, in some embodiments, instructions contained in the image processing modules discussed above may not interact with these hardware resources directly, but instead interact through standard subroutines or APIs located in operating system component 250. Instructions within operating system 250 may then interact directly with these hardware components. Operating system module 250 may further configure the image processor 220 to share information with device processor 255.

Device processor 255 may be configured to control the display 260 to display the captured image, or a preview of the captured image, to a user. The display 260 may be external to the imaging device 200 or may be part of the imaging device 200. The display 260 may also be configured to provide a view finder displaying a preview image for a use prior to capturing an image, or may be configured to display a captured image stored in memory or recently captured by the user. The display 260 may comprise an LCD or LED screen, and may implement touch sensitive technologies.

Device processor 255 may write data to storage module 270, for example data representing captured images. While storage module 270 is represented graphically as a traditional disk device, those with skill in the art would understand that the storage module 270 may be configured as any storage media device. For example, the storage module 270 may include a disk drive, such as a floppy disk drive, hard disk drive, optical disk drive or magneto-optical disk drive, or a solid state memory such as a FLASH memory, RAM, ROM, and/or EEPROM. The storage module 270 can also include multiple memory units, and any one of the memory units may be configured to be within the image capture device 200, or may be external to the image capture device 200. For example, the storage module 270 may include a ROM memory containing system program instructions stored within the image capture device 200. The storage module 270 may also include memory cards or high speed memories configured to store captured images which may be removable from the camera. The storage module 270 can also be external to device 200, and in one example device 200 may wirelessly transmit data to the storage module 270, for example over a network connection.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components, for example to save cost and/or to improve performance.

Additionally, although FIG. 2 illustrates two memory components, including memory component 230 comprising several modules and a separate memory 265 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 220. For example, working memory 265 may comprise RAM memory, with instructions loaded into working memory 265 before execution by the processor 220.

Overview of Example Radon Photography Process

Figure 3:
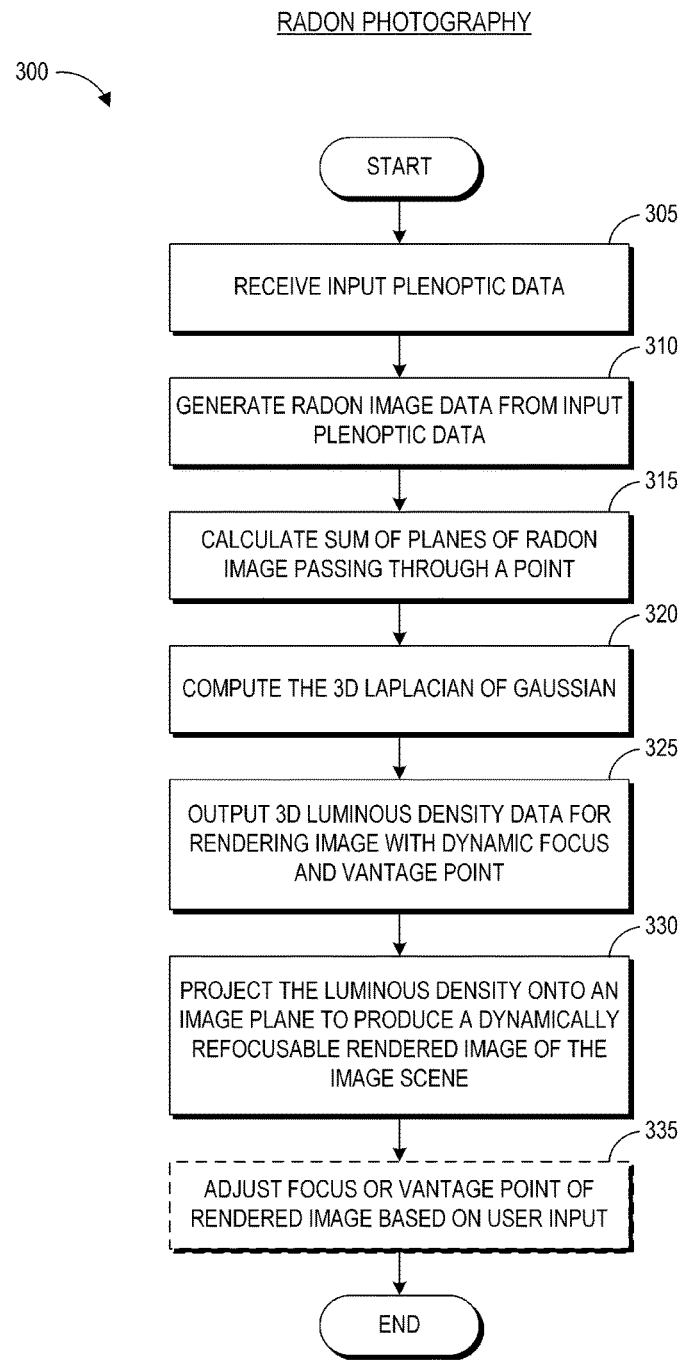
FIG. 3 illustrates an embodiment of a Radon photography process.

FIG. 3 illustrates an embodiment of a Radon photography process 300. The process 300 is described as being executed by the Radon photography module 240 and its subcomponents, described above with respect to FIG. 2. However, this is for illustrative purposes and is not meant to limit the process 300, which can be executed by any device or system having Radon photography capabilities.

At block 305, the Radon photography module 240 can receive plenoptic image data, for example from the plenoptic camera assembly 201, which can be any of the plenoptic cameras 100a-100d represented by FIGS. 1A-1D or any other camera capable of capturing plenoptic or light field image data. The Radon photography module 240 may receive a complete set of plenoptic image data after image capture in some embodiments. In other embodiments, the Radon photography module 240 may receive plenoptic image data during image capture. For example, the Radon photography module 240 may receive the plenoptic image data in portions corresponding to predetermined planes of integration in one example.

At block 310, the Radon image generator 242 of the Radon photography module 240 can generate a Radon image from the input plenoptic image data. For example, the Radon image generator 242 can apply the Radon transform to calculate the integral of the value of light rays in one or more planes of integration.

Given a luminous density $f(x,y,z)$, the Radon image $\hat{f}_{\theta,\phi}(r)$ can be computed by integrating the function value over all possible planes in one embodiment. In another embodiment, a subset of all possible planes can be identified for computing the Radon image $\hat{f}_{\theta,\phi}(r)$. The plane(s) of integration can be planes normal to and intersecting the sensor plane of the plenoptic camera, and the position and location of the plane(s) of integration can be determined based on the configuration of the sensor such that each distinct pixel of the sensor (or each distinct microimage formed on the sensor by the microlens array) is sampled by at least one plane of integration.

The Radon transform in three dimensions can be expressed as:

$$\hat{f}_{a,b,c}(r) = \int_{-\infty}^{+\infty}\int_{-\infty}^{+\infty}\int_{-\infty}^{+\infty} f(x,y,z)\delta(az+by-r)dxdydz \quad (3)$$

A parameterization of a plane, given by the parameters φ, θ, r can be beneficial in some embodiments for computing the inverse Radon transform used to render images from the Radon image. Accordingly, the Radon transform for a plane defined in polar coordinates can be expressed as Equation (4), below:

$$\hat{f}_{a,b,c}(r) = \int_{-\infty}^{+\infty} \int_{-\infty}^{+\infty} \int_{-\infty}^{+\infty} f(x,y,z) \delta(x \cos\phi \sin\theta + y \sin\phi \sin\theta + z \cos\theta - r) dx\,dy\,dz \quad (4)$$

An example of the Radon photography technique can effectively integrate all rays that fall within the plane then apply the inverse Radon transform (i.e., the inverse of Equations (3) or (4), as will be explained in more detail with respect to block 315.

At block 315, the luminous density calculator 244 of the Radon photography module 240 can sum over all of the planes of the Radon image passing through a point. This can calculate a back-projection of the Radon image. For example, the luminous density calculator 244 can apply an inverse Radon transform to the Radon image as described below in Equation (5). Luminous density calculator 244 can take the input Radon image $\hat{f}_{\theta,\varphi}(r)$ and reproduce the luminous density $f(x,y,z)$. By applying the inverse Fourier transform and Fourier Slice Theorem, the expression for determining the inverse Radon transform can be:

$$f(x, y, z) = \frac{-1}{8\pi^2} \Delta_{x,y,z} \left( \int_{\varphi=0}^{2\pi} \int_{\theta=0}^{\pi} \hat{f}_{\theta,\varphi}(r) \sin\theta\, d\theta\, d\varphi \right) \quad (5)$$

where r is given by:

$$r = x \cos\phi \sin\theta + y \sin\phi \sin\theta + z \cos\theta \quad (6)$$

Notably, Equation (5) has the same form as the Poisson equation. Accordingly, the back-projection of the Radon image can be expressed as:

$$f^1(x,y,z) = \Sigma_{\phi=0}^{2\pi} \Sigma_{\theta=0}^{\pi} \hat{f}_{\theta,\phi}(r) \sin\theta \quad (7)$$

where r is given by Equation (6) and $f^1$ represents the backprojected Radon image. In some embodiments, $f^1$ can look like a burred version of the actual function At block 320, the luminous density calculator 244 can apply a three-dimensional Laplacian of Gaussian to the back-projection $f^1$ in order to recover the original luminous density of the image scene, or an approximation thereof. In some embodiments this can produce a noisy version of the original function $f(x,y,z)$, which after denoising can provide the density of the virtual light sources. Accordingly, in some embodiments the luminous density calculator 244 can perform denoising on the back-projection $f^1$ after applying the three-dimensional Laplacian of Gaussian.

At block 325, the Radon photography module 240 can output the luminous density of the plenoptic data, for example in one embodiment for rendering an image with dynamic focus and vantage point. Projecting the luminous density onto an image plane can produce images of the target image scene at different depths of focus or different vantage points. In one embodiment, the flat rendering module 246 can perform rendering of images from the luminous density. In another embodiment, the Radon photography module 240 can output the luminous density for storage.

At block 330, the flat rendering module 246 can project the luminous density onto an image plane to produce a dynamically refocusable rendered image of the image scene. The rendered image is referred to as "dynamically refocusable" due to the fact that, based on the luminous density, images from different viewpoints and/or having different depths of focus can be rendered of the same image scene.

At optional block 335, the flat rendering module 246 can adjust the focus and/or vantage point of the rendered image based on user input. For example, flat rendering module 246 can receive an indication of user input from device processor 255 indicating that the user has selected an option to adjust one or both of the vantage point from which the rendered image appears to have been taken or the depth of focus of the rendered image.

Overview of Example Radon Image Generation Process

Figure 4A:
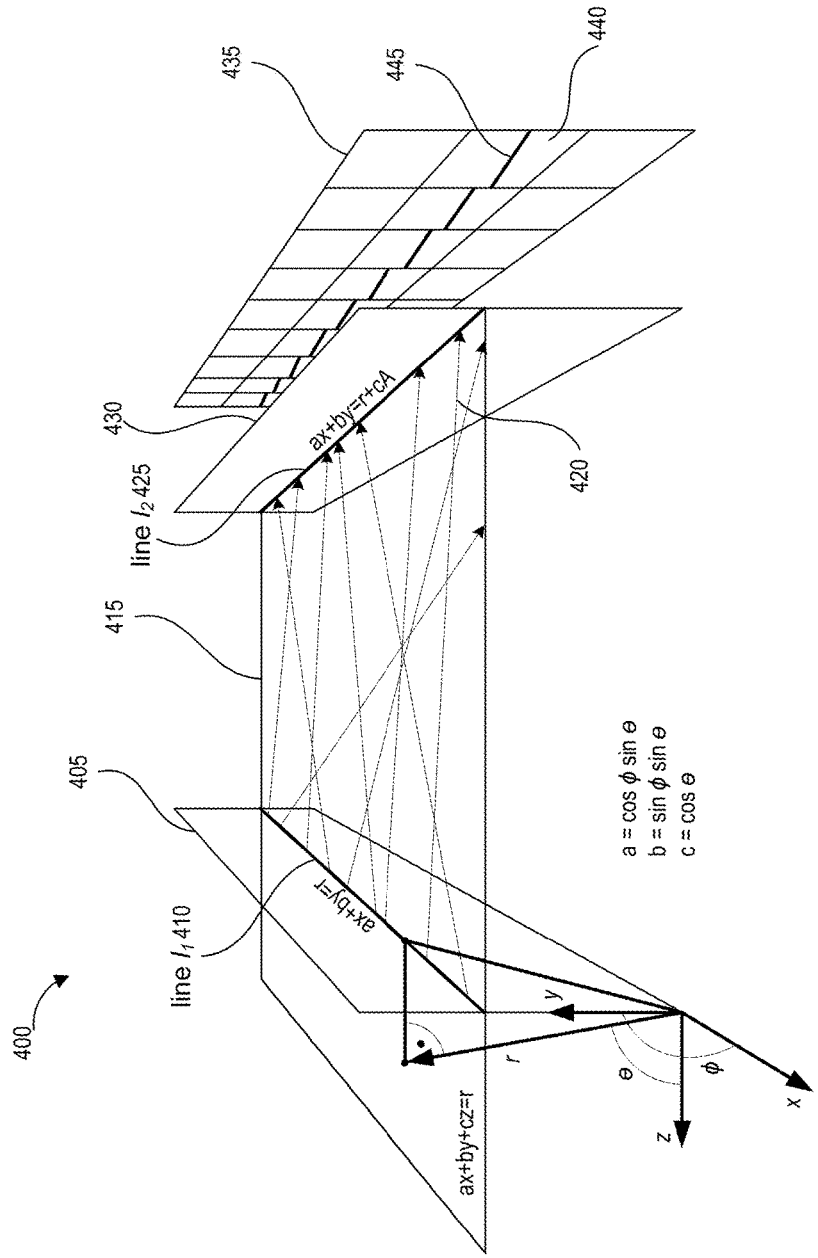
FIG. 4A illustrates an embodiment of a technique of using plenoptic camera planes for Radon image generation.

FIG. 4A illustrates an embodiment of plenoptic camera planes 400 that can be used in Radon image generation. The planes 400 can include an image plane 405, a microlens plane 430, a plane of integration 415, and a sensor plane 435. The image plane 405 can represent a plane formed by the image plane, for example a plane passing through the point of focus of a main lens of a plenoptic camera. The microlens plane 430 can represent a plane formed through a microlens array of a plenoptic camera, for example a plane bisecting each of the lenses of the microarray. The plane of integration 415 can represent a plane intersecting both the image plane 405 and the microlens plane 430. Although the plane of integration 415 is depicted in a certain location relative to the other planes, in some embodiments the location of the plane of integration 415 can vary based on the parameters of the photo sensor, and in addition multiple planes of integration can be used to generate a Radon image, as will be discussed in more detail below. The sensor plane 435 can represent a plane formed by the surface of a photo sensor of a plenoptic camera, and can include a plurality of regions 440 corresponding to microimages formed by the microlenses within the microlens array.

Correct parameterization of the objects involved can aid in efficient computing of the Radon image. In one embodiment, 2-plane parameterization can be used for representing light fields where the first two parameters (a first coordinate) denote the location of the start point of the ray 420 under consideration on the image plane 405 and the last two parameters (a second coordinate) denote the location of the end point of the ray 420 on the microlens plane 430, where the image plane 405 and the microlens plane 430 can be separated by a distance A.

To compute the integral over light rays 420 lying in the plane of integration 415, the Radon photography technique can determine the pixels onto which image line 410 is mapped in the corresponding microimages 440 of the microlenses lying along the microlens line 425. In one embodiment, each microlens can correspond to one microimage, and each microimage can correspond to one pixel of the image sensor. In another embodiment, each microimage can correspond to a plurality of pixels of the image sensor. The image line 410 can represent a vector passing through the intersection of the image plane 405 and the plane of integration 415. The microlens line 425 can represent a vector passing through the intersection of the plane of integration 415 and the microlens plane 430.

In order to locate the pixels/microimages lying along the microlens line 425, the Radon photography technique can compute the focal length of a microlens and compute the magnification of the microlens using Equation (1) above. This can be computed, in some embodiments, for each microlens in the array that intersects with the microlens line, allowing the Radon photography technique to locate the pixels corresponding to the rays 420 lying in the plane of integration.

An example of a simple model for the plenoptic camera is illustrated in FIG. 4A where the light rays, after entering the camera through the main lens, form a real image at plane P1 405. This image is re-imaged by each of the microlenses located at plane P2 430 onto the sensor plane 435. The Radon photography technique can determine the sum over all rays 420 that lie in an arbitrary plane P 415.

To compute the integral of rays lying in plane P 415, one needs to determine the corresponding pixels on the sensor plane 435 where the rays are mapped by each of the microlenses. For this purpose, the Radon photography technique can determine the image of line $l_1$ 410 as produced by an arbitrary microlens, placed at $(x_0, y_0)$. The equation of line $l_1$ can be given by:

$$ax + by = r \qquad (8)$$

Similarly, the equation of line $l_2$ can be given by:

$$ax + by = r + cA \qquad (9)$$

The image of a point $(x,y)$ by the microlens placed at $(x_0, y_0)$ can be given by:

$$x_1 = -M(x - x_0), y_1 = -M(y - y_0) \qquad (10)$$

where M is the magnification of the microlens. Substituting the values of x and y from the above equations into the equation of line $l_1$ 410 written in the form of y=mx+d, we get:

$$y_1 = mx_1 - M(mx_0 + d - y_0) \qquad (11)$$

Note that for Equation (11), the origin is fixed at the intersection of the optical axis of the microlens plane 430 and the sensor plane 430, M is the microlens magnification, m equals the slope of the microlens line 425, and $$m = \frac{-a}{b} = \cot\theta \qquad (12)$$

$$d = \frac{r}{b} = \frac{r}{\sin\varphi \sin\theta} \qquad (13)$$

The Radon image $\hat{f}_{\theta,\varphi}(r)$ can be obtained by summation over all pixels that lie on the line represented by Equation (11), for each microlens intersected by plane P 415. These pixels are represented in FIG. 4A by line of intersection 445.

Figures 4B, 4C:
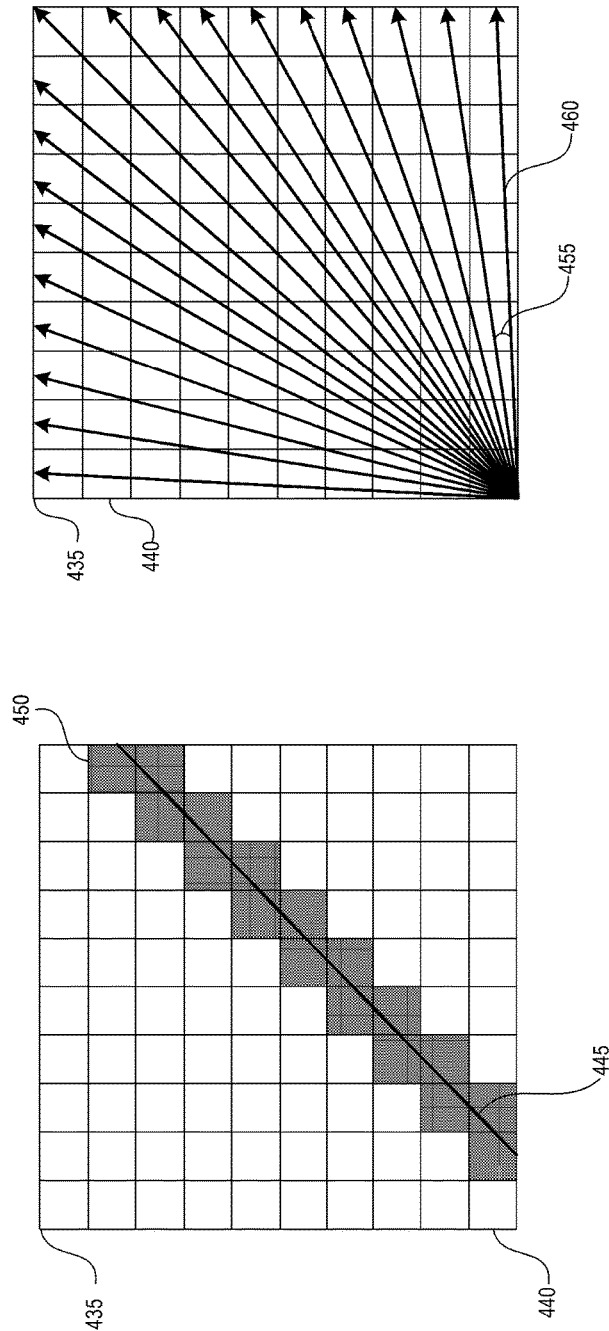
FIG. 4B illustrates an embodiment of a set of pixels or microimages that can be used in Radon image generation.
FIG. 4C illustrates an embodiment of a density of lines of integration that can be used in a method of 3D Radon image generation.

FIG. 4B illustrates an embodiment of a set of pixels or microimages 440 that can be used in Radon image generation. FIG. 4B illustrates one example of how a set of microimages or pixels 440 can be selected from the plurality of microimages or pixels 440 of the plenoptic camera photo sensor once an intersection line 445 is determined according to Equations (8) through (11) above. In the illustrated example, each microimage/pixel 440 that the line 445 passes through (depicted using the orange color) can be selected for computing the Radon transform of the corresponding plane of integration 415, as represented by the shaded microimages 450. The Radon transform can be calculated using pixel values of the selected microimages 450. FIG. 4B illustrates one example of integrating over the pixels 450 in a given microimage, which can be done by adding up pixel intensity values. In order to compute the Radon image $\hat{f}$, multiple planes of integration are used, as discussed above with respect to block 315 of FIG. 3.

FIG. 4C illustrates an embodiment of lines of integration 460 that can be used in Radon image generation. The lines of integration 460 can correspond to a plurality of intersection lines—that is, the mapping of image lines/microlens lines onto the sensor plane 435—and therefore represent edges of a plurality of planes of integration used to generate a Radon image $\hat{f}$.

As shown in FIG. 4C, a plurality of lines of integration 460 sample distinct microimages 440 corresponding to the microlenses of the plenoptic camera when the steps by which $\varphi$ 455 is varied are high enough. One way to ensure that each microimage 440 is sampled by at least one line of integration 460 is to generate lines from a starting point on the sensor plane 435 (here illustrated as a corner of the sensor plane 435) to each the microimages 440 along at least one border of the sensor plane 435 (here illustrated as ending approximately in the center of the outer edge of each microimage 440, the outer edge being a border of the sensor plane 435). The angles formed by each pair of adjacent lines can be measured, and the smallest angle can be selected as the step size $\varphi$ 455. This represents one example of determining a step size for $\varphi$.

The choices for the start and end values and the step size for the parameters $\varphi$, $\theta$, and r in the equations above can determine the sampling of the light field space. The parameter $\varphi$ can represent the step size between lines of integration over a plenoptic sensor. One embodiment for determining the step size for $\varphi$ is described above with respect to FIG. 4C. In another embodiment, $\varphi$ can be varied in steps of size one degree from zero 360. This sampling can be sufficient in one example for images captured using a plenoptic sensor having a 75×75 area. Denser sampling (e.g., smaller step size for $\varphi$) may not provide additional information due to adjacent lines sampling the same set of pixels, leading to redundant information, larger data size for the Radon image, greater processor usage, and longer run times.

The choice of location for the origin, which is the center of the sphere used for parameterizing planes, can also have an impact on the computing required for the Radon transform. Locating the origin at the center of the point cloud of the scene as imaged by the main lens may provide for marginally better quality sampling, however computing the center accurately can be costly and is not required. Accordingly, some embodiments can compute the center, while other embodiments can approximate the center by using the following formula:

$$\text{center} = \frac{B\left(\frac{1}{M_{closest}} + \frac{1}{M_{farthest}}\right)}{2} \qquad (14)$$

where $M_{closest}$ and $M_{farthest}$ are the minimum and maximum values of magnification for the scene under consideration with respect to the microlens array and B represents the distance between the microlens plane 430 and the sensor plane 435. One example of computing the approximate magnification of a given point with respect to a microlens array is given by the ratio between the number of times the point is repeated in a row and the number of horizontal pixels in a microimage.

The parameter r can represent a vector passing through the origin which is also perpendicular to the plane of integration. The maximum value that r can have in one embodiment ($r_{max}$) is the length of the diagonal of an image formed on the sensor, determined from the number of pixels in the vertical and horizontal directions. In one embodiment, r can be varied in steps of one between 1 and $r_{max}$, as a smaller step size may not significantly improve reconstruction of the plenoptic function from the Radon image due the sensor tolerance of one pixel. Smaller step size may, however, contribute to a significant increase in run time due to denser sampling.

The parameter $\theta$ can represent an angle between the vector r and the z-axis in an (x,y,z) coordinate system mapped to the three-dimensional image scene. In the above equations, the interval over which $\theta$ is varied substantially contributes to refocusing due to its association with depth values along the z-axis in the data representing three-dimensional target image scene. In one embodiment, $\theta$ can be varied between 80 and 100 with a step size of one.

Figure 5:
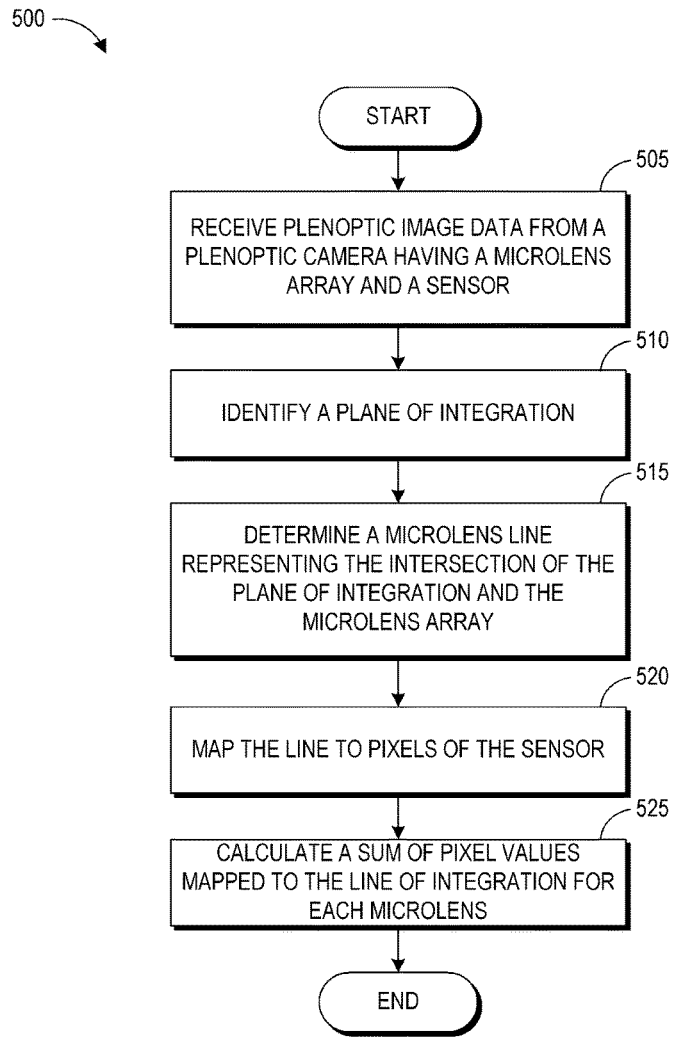
FIG. 5 illustrates an embodiment of a process for generating a Radon image from input light field data.

FIG. 5 illustrates an embodiment of a process 500 for generating a Radon image from input light field data. The process 500 is described as being executed by the Radon photography module 240 and its subcomponents, described above with respect to FIG. 2. However, this is for illustrative purposes and is not meant to limit the process 500, which can be executed by any device or system having Radon photography capabilities.

At block 505, the Radon photography module 240 can receive plenoptic image data, for example from the plenoptic camera assembly 201, which can be any of the plenoptic cameras 100a-100d represented by FIGS. 1A-1D or any other camera capable of capturing plenoptic or light field image data. The Radon photography module 240 may receive a complete set of plenoptic image data after image capture in some embodiments. In other embodiments, the Radon photography module 240 may receive plenoptic image data during image capture. For example, the Radon photography module 240 may receive the plenoptic image data in portions corresponding to predetermined planes of integration in one example.

At block 510, the Radon image generator 242 can identify a plane of integration. In some embodiments, the Radon image generator 242 can receive data indicating sensor parameters such as pixel size, and can determine one or more planes of integration that collectively operate to sample each distinct pixel of, or microimage formed on, the sensor as is described above with respect to FIG. 4C. In other embodiments, the Radon image generator 242 can receive data indicating the number and location of the planes of integration, for example from image processor 220 retrieving such information from data store 270. For example, the plane or planes of integration needed for generating a Radon image can be predetermined for a sensor. In some embodiments, block 510 may be optional. Predetermined planes of integration can be used to scan only pixels, or a plurality of pixels corresponding to microimages, for pixels or microimages predetermined to intersect with the plane of integration, and this partial plenoptic image data can be sent to the Radon photography module 240 for application of the Radon transform.

At block 515, the Radon image generator 242 can determine a microlens line representing the intersection of the determined plane of integration and the microlens array of the plenoptic camera. For example, a microlens line 425 is illustrated above with respect to FIG. 4A. At block 520, the Radon image generator 242 can map the microlens line to specific pixels and/or microimages on the sensor. This can be accomplished, in one example, by Equation (11) described above. In some embodiments, planes of integration and their corresponding microlens lines and pixels/microimages mapped to the microlens lines can be computed in advance of image capture, and this data can be retrieved by the Radon image generator 242 during application of the Radon transform to input plenoptic image data. In further embodiments, the pre-computed data indicating pixels mapped to predetermined microlens lines can be used to segment data as it is captured by the sensor, sending only pixel values relevant to the current plane of integration to the Radon image generator, and blocks 515 and 520 can be optional.

At block 525, the Radon image generator 242 can calculate the sum of pixel values that are mapped to the microlens line. This can be done individually by microimage for each pixel within the microimage that is mapped to the microlens line in one embodiment. In one example, the Radon image generator 242 can calculate the sum of the pixel values using either of Equations (3) and (4) above.

The process 500 as detailed above can be repeated, in some embodiments, for each plane of integration determined to be needed for computing the Radon image.

Some embodiments of the process 500 can be implemented after image capture to change the structure of existing or stored plenoptic image data. Other embodiments of the process 500 can be implemented during image capture to change the structure of plenoptic image data as it is captured. For example, intersection lines can be predetermined prior to image capture such that the intersection lines sample each distinct pixel or microimage, as illustrated by FIG. 4C. Pixels corresponding to the intersection lines can be determined according to Equation (11) above. During image capture, the pixels of the photo sensor can be scanned in rows or lines according to the corresponding intersection lines. Some embodiments may scan the pixels sequentially for each intersection line, and accordingly the integral value of each plane of integration corresponding to the intersection lines can be sequentially calculated, for example based at least partly on the pixel intensity values. In other embodiments the values for the planes of integration can be computed in parallel. The values of the light rays (represented by pixel values) incident on those pixels or microimages can be summed or integrated according to the Radon transform of the plane expressed in Equation (4). The resulting values, representing the sum of light rays over the planes of integration, can be stored as a Radon image. In one embodiment, the Radon image data can be represented as an array of values with one value for each sampled plane, wherein the values in the array are the sum of light rays over that plane.

Overview of Example Process for Integration of a Radon Image

Figure 6:
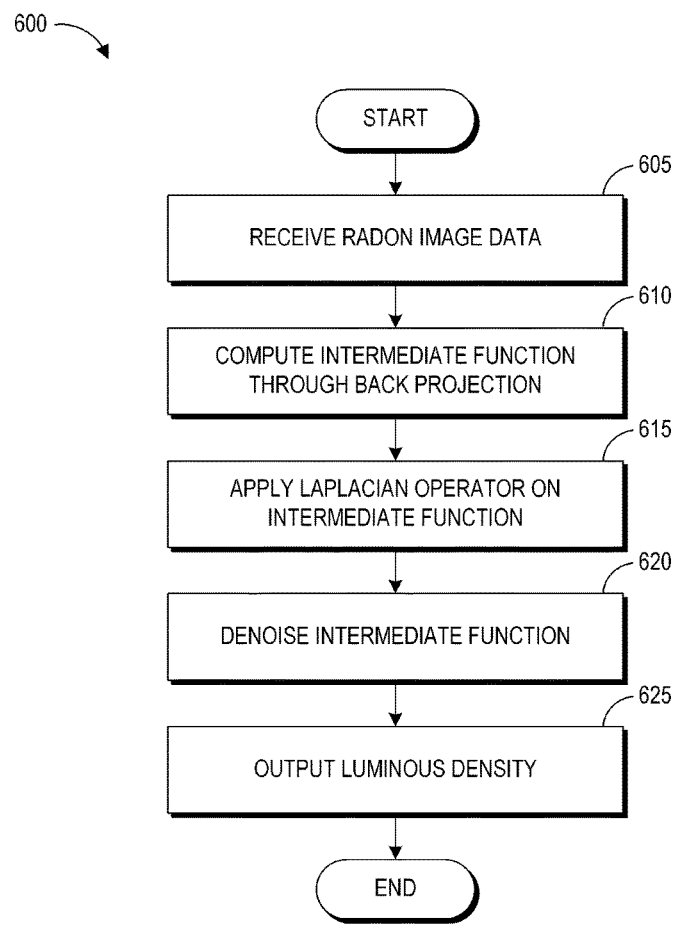
FIG. 6 illustrates an embodiment of a process for generating plenoptic image data from a Radon image.

FIG. 6 illustrates an embodiment of a process 600 for generating plenoptic image data from a Radon image. The process 600 is described as being executed by the Radon photography module 240 and its subcomponents, described above with respect to FIG. 2. However, this is for illustrative purposes and is not meant to limit the process 600, which can be executed by any device or system having Radon photography capabilities.

At block 605, the luminous density calculator 244 can receive Radon image data, for example from the Radon image calculator 242 or from the image processor 220 retrieving a Radon image stored in the storage 270. The Radon image can be an expression of a plenoptic function in terms of summed energy over planes intersecting the image sensor of the capturing plenoptic camera rather than the traditional expression of plenoptic image data in terms of summed energy of rays incident on the image sensor.

At block 610, the luminous density calculator 244 can calculate an intermediate function through back-projection of the Radon image. In one embodiment, this can be accomplished through Equation (7) defined above. Back projection can take the Radon image function, defined on each plane in the three-dimensional image space, and projects the planes over the image space to reproduce the original luminous density. The back-projection can be a blurry version of the original plenoptic function in some embodiments.

At block 615, the luminous density calculator 244 can apply the Laplacian of Gaussian operator to the blurry back-projection in order to sharpen the back-projection and bring it closer to the original plenoptic function. However, application of the Laplacian of Gaussian operator can add undesirable noise to the back-projection in some embodiments.

Accordingly, at block 620, the luminous density calculator 244 can denoise the back-projection after application of the Laplacian of Gaussian operator to recover the original plenoptic function, or to substantially recover the original plenoptic function.

Implementing Systems and Terminology

Implementations disclosed herein provide systems, methods and apparatus for capturing and rendering from plenoptic image data. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the CNR process discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system comprising:
    a plenoptic camera including a microlens array and an image sensor having a plurality of pixels, the plenoptic camera configured to capture plenoptic image data of a scene; and
    one or more processors in data communication with the plenoptic camera and configured to at least:
        receive the captured plenoptic image data, the captured plenoptic image data including a plurality of microimages each formed by one of a plurality of microlenses in the microlens array focusing light from the scene onto the image sensor,
        for each line of integration, of a plurality of lines of integration, located within a plane bisecting the microlens array, access a mapping of the line of integration from the plane bisecting the microlens array to a set of pixels of the plurality of pixels of the image sensor, the mapping based at least partly on focal length and magnification of microlenses of the microlens array lying along the line of integration, wherein each line of integration corresponds to a plane extending through three dimensional space of the scene, adjacent lines of integration separated by a step size such that each line of integration samples a different set of pixels of the image sensor,
        for each line of integration, sum pixel values of the set of pixels of the image sensor mapped to the line of integration in the mapping, and
        generate a Radon image based at least partly on the summed pixel values corresponding to each line of integration.

2. The system of claim 1, wherein the one or more processors are further configured to determine the mapping for each line of integration by mapping the line of integration to at least one corresponding microimage of the plurality of microimages to determine a corresponding image line.

3. The system of claim 2, wherein the one or more processors are further configured to determine the set of pixels of the plurality of pixels of the image sensor based at least partly on intersection of the corresponding image line with the plurality of pixels of the image sensor.

4. The system of claim 3, wherein the one or more processors are further configured to generate a plurality of summed pixel values by, for each of the plurality of lines of integration, determining a sum of the pixel values associated with each of the plurality of pixels intersecting the corresponding image line.

5. The system of claim 4, wherein the one or more processors are further configured to generate the Radon image as an array of the plurality of summed pixel values.

6. The system of claim 4, wherein the pixel values are intensity values.

7. A system comprising:
    a memory storing Radon photography instructions; and
    at least one hardware processor configured by the Radon photography instructions to generate data representing a Radon image representing, for each sampled plane of a plurality of sampled planes extending through a scene, a sum of light energy in the sampled plane, wherein to generate the data representing the Radon image the at least one processor is configured to at least:
        receive at least a portion of data from an image sensor having a plurality of pixels and configured to receive light from the scene through a microlens array and capture plenoptic image data of the scene; and
        access, for each sampled plane, a mapping of a line of integration to a set of the plurality of pixels of the image sensor, the line of integration located within a plane bisecting the microlens array at an intersection of the sampled plane with the microlens array, the mapping based at least partly on focal length and magnification of microlenses of the microlens array lying along the line of integration, and wherein the lines of integration of adjacent sampled planes of the plurality of sampled planes are separated by a step size such that each line of integration samples a different set of pixels of the image sensor;
        for each line of integration, sum pixel values of the set of pixels of the image sensor mapped to the line of integration in the mapping;
        calculate the sum of light energy in each sample plane based at least partly on the summed pixel values;
        determine a luminous density of the scene based at least partly on integrating the sum of light energy from each sampled plane of the plurality of sampled planes of the Radon image; and
        produce a final image by projecting the luminous density onto an image plane.

8. The system of claim 7, wherein the final image is dynamically adjustable through a range of different viewpoints and dynamically refocusable through a range of different depths of focus of the scene.

9. The system of claim 7, further comprising the image sensor and the microlens array.

10. The system of claim 7, wherein the captured plenoptic image data expresses a light field of the scene in terms of intensity of a plurality of rays of light incident on the image sensor from objects in the scene.

11. The system of claim 10, wherein the Radon image expresses the light field in terms of energy contained in planes located in the scene, the planes intersecting the image sensor.

12. The system of claim 9, further comprising a plenoptic camera comprising the image sensor and the microlens array.

13. The system of claim 12, wherein the plenoptic camera comprises a main lens, and wherein the microlens array comprises a plurality of microlenses positioned to receive light from the scene through the main lens.

14. The system of claim 13, wherein the plurality of microlenses each comprise a microsphere.

15. The system of claim 7, wherein the at least one processor is configured by the Radon photography instructions to at least access the data representing the Radon image by retrieving the Radon image from a data store.

16. The system of claim 7, wherein the at least one processor is configured by the Radon photography instructions to at least determine the luminous density of the scene based at least partly on calculating a back-projection of the Radon image.

17. The system of claim 16, wherein the at least one processor is configured by the Radon photography instructions to at least apply a Laplacian of Gaussian operator to the back-projection.

18. The system of claim 17, wherein the at least one processor is configured by the Radon photography instructions to at least denoise the back-projection after applying the Laplacian of Gaussian operator.

19. A method comprising:
by one or more hardware processors:
receiving at least a portion of data representing a plenoptic image of a three-dimensional image space from a plenoptic camera having a microlens array including a plurality of microlenses and an image sensor positioned to receive light from the image space through the microlens array;
for each line of integration of a determined plurality of lines of integration located within a plane bisecting the microlens array, accessing a mapping of the line of integration to a set of a plurality of pixels of the image sensor, the mapping based at least partly on focal length and magnification of the microlenses lying along the line of integration, wherein each of the plurality of lines of integration corresponds to a plane extending through three dimensional space of the image scene, and wherein adjacent lines of integration are separated by a step size such that each line of integration samples a different set of pixels of the image sensor; and
for each of the lines of integration, summing pixel values for each of the set of plurality of pixels in the mapping.

20. The method of claim 19, further comprising generating a Radon image as an array of the summed pixel values.

21. The method of claim 19, wherein each of a plurality of microlenses of the microlens array forms a microimage on the image sensor.

22. The method of claim 19, further comprising parameterizing the three-dimensional image space using a polar coordinate system.

23. A non-transitory, computer-readable medium storing instructions that, when executed, cause one or more computing devices to perform operations comprising:
generating Radon image data of a scene, the Radon image data representing a luminous density of the scene as summed values of light energy in each of a plurality of planes extending through the scene, wherein generating the Radon image data comprises calculating the summed values of light energy at least partly by:
receiving data from an image sensor having a plurality of pixels used to capture plenoptic image data of the scene, the image sensor positioned to receive light from the scene through a microlens array; and
for each line of integration of a determined plurality of lines of integration located within a plane bisecting the microlens array, accessing a mapping of the line of integration from the plane bisecting the microlens array to a set of pixels of the plurality of pixels of the image sensor, the mapping based at least partly on focal length and magnification of microlenses of the microlens array lying along the line of integration, wherein each line of integration represents an intersection of one of the plurality of planes with the microlens array, and wherein adjacent lines of integration are separated by a step size such that each line of integration samples a different set of pixels of the image sensor;
for each of the plurality of lines of integration, summing pixel values of the set of pixels in the mapping;
computing an intermediate function of the Radon image using a back-projection of the Radon image;
recovering the luminous density of the scene based at least partly on the intermediate function of the Radon image; and
projecting the luminous density onto an image plane to produce a dynamically refocusable rendered image of the scene.

24. The non-transitory, computer-readable medium of claim 23, the operations further comprising applying a Laplacian operator to the back-projection of the Radon image to compute the intermediate function.

25. The non-transitory, computer-readable medium of claim 24, the operations further comprising denoising the back-projection of the Radon image to compute the intermediate function.

26. The non-transitory, computer-readable medium of claim 23, the operations further comprising adjusting a focus depth of the dynamically refocusable rendered image in response to user input.

* * * * *